US00RE44825E

(19) United States
(12) Reissued Patent
Imanaka et al.

(10) Patent Number: US RE44,825 E
(45) Date of Reissued Patent: Apr. 8, 2014

(54) PRINT HEAD SUBSTRATE, PRINT HEAD USING THE SAME, AND PRINTING APPARATUS

(75) Inventors: Yoshiyuki Imanaka, Yokohama (JP); Tatsuo Furukawa, Atsugi (JP); Kimiyuki Hayasaki, Yokohama (JP); Hiroyuki Maru, Atsugi (JP); Masaaki Izumida, Sanjo (JP)

(73) Assignee: Canon Kabushiki Kaisha, Tokyo (JP)

(21) Appl. No.: 13/312,437

(22) Filed: Dec. 6, 2011

Related U.S. Patent Documents

Reissue of:
(64) Patent No.: 6,243,111
Issued: Jun. 5, 2001
Appl. No.: 09/002,373
Filed: Jan. 2, 1998

U.S. Applications:
(63) Continuation of application No. 08/299,419, filed on Sep. 1, 1994, now abandoned.

(30) Foreign Application Priority Data

Sep. 3, 1993 (JP) ..... 5-219786

(51) Int. Cl.
*B41J 29/38* (2006.01)

(52) U.S. Cl.
USPC ..... 347/13; 347/56; 347/57

(58) Field of Classification Search
USPC ..... 347/5, 9, 12, 13, 56, 57, 58, 59, 205, 347/191, 192, 211, 180; 346/1.1; 327/206
See application file for complete search history.

(56) References Cited

U.S. PATENT DOCUMENTS 4,313,124 A 1/1982 Hara
4,345,262 A 8/1982 Shirato et al.

(Continued)

FOREIGN PATENT DOCUMENTS

DE 2843064 10/1978
EP 0103943 3/1984

(Continued)

OTHER PUBLICATIONS

Sedra, Adel S. and Kenneth C. Smith, "Microelectronic Circuits," 3rd ed., Ch. 12, pp. 841-69, Philadelphia, Saunders College Publishing, 1991.

(Continued)

*Primary Examiner* — Lam S Nguyen
(74) *Attorney, Agent, or Firm* — Fitzpatrick, Cella, Harper & Scinto

(57) ABSTRACT

The present invention is directed to resolve the noise problem with the ink in an ink jet head without changing the substrate manufacturing process for the ink jet head, that is, increasing the cost on the manufacture, and without needs of disposing a noise countermeasure component on the side of the printer main device, or making the design change for the countermeasure. The present invention is characterized in that to prevent malfunction from arising by the noise, a hysteresis circuit to provide different input data threshold values upon rising and falling is provided on an input portion of the signal for a drive control logic system such as a drive input signal for a shift register and a latch circuit on the same substrate as that of the heating elements, the driver and the drive control logic circuit, utilizing a diffusion layer constituting a driver.

64 Claims, 5 Drawing Sheets

(56) References Cited

U.S. PATENT DOCUMENTS

| | | | | |
|---|---|---|---|---|
| 4,459,600 | A | 7/1984 | Sato et al. | |
| 4,463,359 | A | 7/1984 | Ayata et al. | |
| 4,558,333 | A | 12/1985 | Sugitani et al. | |
| 4,608,577 | A | 8/1986 | Hori | |
| 4,723,129 | A | 2/1988 | Endo et al. | |
| 4,740,796 | A | 4/1988 | Endo et al. | |
| 5,173,717 | A | 12/1992 | Kishida et al. | |
| 5,327,020 | A * | 7/1994 | Ikeda | 327/206 |
| 5,943,070 | A | 8/1999 | Kamiyama et al. | |
| 6,137,509 | A | 10/2000 | Hayasaki | |
| 6,290,334 | B1 | 9/2001 | Ishinaga et al. | |

FOREIGN PATENT DOCUMENTS

| | | |
|---|---|---|
| EP | 0393602 | 10/1990 |
| EP | 0461938 | 12/1991 |
| EP | 0488806 | 6/1992 |
| JP | 54-51837 | 4/1979 |
| JP | 54-56847 | 5/1979 |
| JP | 57-173172 | 10/1982 |
| JP | 59-123670 | 7/1984 |
| JP | 59-138461 | 8/1984 |
| JP | 60-71260 | 4/1985 |
| JP | 63-158264 | 7/1988 |
| JP | 59-123670 | 7/1998 |

OTHER PUBLICATIONS

Ream, G.L., "Multiplex Drivers for A Drop-On-Demand Print Head," IBM Techn. Disci. Bull., vol. 25, No. 11A, Apr. 1983, pp. 5652-5655.

Sedra, Adel S. and Kenneth C. Smith, Microelectronic Circuits, 3rd ed., Ch. 12, pp. 841-869, Philadelphia, Saunders College Publishing.

Ream, G.L. "Multiplex Drivers For A Drop-On-Demand Print Head," IBM Techn. Discl. Bull., vol. 25, No. 11A, Apr. 1983, pp. 5652-5655.

* cited by examiner

PRINT HEAD SUBSTRATE, PRINT HEAD USING THE SAME, AND PRINTING APPARATUS

Matter enclosed in heavy brackets [ ] appears in the original patent but forms no part of this reissue specification; matter printed in italics indicates the additions made by reissue.

CROSS-REFERENCE TO RELATED APPLICATION

This application is a *reissue of U.S. Pat. No. 6,243,111, issued on Jan. 5, 2001, which is hereby incorporated by reference, as if fully set forth herein. U.S. Pat. No. 6,243,111 matured from U.S. patent application Ser. No. 09/002,373, filed Jan. 2, 1998, which is a* continuation *application* of U.S. patent application Ser. No. 08/299,419, filed on Sep. 1, 1994, and now abandoned, *which claims the benefit of Japanese Patent Application No. 5-219786, which is hereby incorporated by reference herein in their entirety.*

BACKGROUND OF THE INVENTION

1. Field of the Invention

The present invention relates to an ink jet head substrate which is effective for stable printing without causing malfunction against the noise, an ink jet head using said substrate, and an ink jet printing apparatus such as a printer using said head.

2. Related Background Art

An ink jet recording method (liquid jet recording method) is extremely superior in that the noise produced during operation is as little as to be ignorable, the high speed printing is enabled, and the so-called plain paper can be used for printing without need of a special treatment of fixing, and has become a main stream of the printing method.

In particular, a liquid jet recording method as described in, for example, Japanese Laid-Open Patent Application No. 54-51837 and Deutsche Offenlegungshrift No. 2843064 has a distinct feature in a respect that the motive force for discharging liquid droplets is obtained by applying thermal energy to the liquid, as opposed to other liquid jet recording methods, for example, a method of discharging liquid droplets by applying mechanical pressure.

That is, the recording method as disclosed in the above publications is characterized in that the liquid subjected to heat energy causes a state change with a rapid increase in volume to discharge liquid droplets through orifices at the top end of the ink jet head owing to action force based on said state change, and attach them to the recording medium to effect the recording.

Specifically, the liquid jet recording method as disclosed in Deutsche Offenlegungshrift No. 2843064 has the features that it is not only quite effectively applicable to a so-called drop-on-demand recording method, but also can provide the image with high resolution and quality at high rate because the ink jet head with a high density arrangement of discharge orifices and of the full-line type can be easily embodied.

The ink jet head applied to the above recording method comprises a liquid discharge portion having discharge orifices provided to discharge the liquid and liquid channels communicating to said discharge orifices, each having as its part a heat acting portion where heat energy for discharging liquid droplets is applied to the liquid, the liquid discharge portion being constituted of a head substrate (heater board) having electricity-heat converters (heating elements) as means for generating heat energy and a ceiling plate having grooves for forming discharge orifices and liquid channels.

In recent years, the head substrate has been constructed in a manner not only to have a plurality of heating elements on a substrate, but also provide, within the same substrate, respective heating element drivers, a shift register to transmit serially input image data to the respective drivers in parallel and having the same number of bits as the heating elements, and a latch circuit for temporarily storing data output from the shift register.

FIG. 4 shows an example of a conventional circuit configuration on the substrate. Herein, 400 is a substrate, 401 is a heating element, 402 is a power transistor, 403 is a latch circuit, and 404 is a shift register. In addition, for the purpose of the miniaturization of a printer main power source by reducing the number of heating elements to be driven simultaneously to decrease instantaneous current flow, there is provided a time-division driving block selecting logic 405 such as a decoder provided to divide a group of heating elements into blocks each consisting of a predetermined number of elements and make the division driving of each block as a unit, and a logic system buffer 406. The input signals include those for the clock of operating the shift register, the image data input of receiving image data in serial, the latch clock of holding data in the latch circuit, the block enable of block selection, the drive pulse (heat pulse) width input of controlling externally the ON time of the power transistor, i.e., the time for driving the heating elements, a logic circuit drive power source (5V), GND, and a heating element drive power source, these signals being input via pads 407, 408, 409, 410, 411, 412, 413 and 414 on the substrate, respectively.

A drive sequence includes first transmitting image data from the printer main device in synchronism with the clock and serially to the substrate within the head, which data is read by the shift register 404 within the substrate. The read data is temporarily stored in the latch circuit 403 to make the block selection in time division until next image data is held in the latch circuit. At each block selection, if a pulse is input from the heat pulse 411, the block selection is performed, and if image data is on, one or more power transistors 402 are turned on; and said block selection is made, and if image data is on, current is flowed through one or more heating elements to effect the driving.

As above described, the integration of the logic circuit such as a driver, a shift register, a latch, etc. into the head substrate has recently progressed, but the current pulse flowing through each heating element reaches 100 to 200 mA instantaneously, and for example, if the heating elements turning on at the same time are eight elements, a current pulse of about 1 to 1.5 A will flow through the heating element drive power source line and the GND line. The problem herein encountered is that the logic circuit on the head substrate may cause malfunction due to the noise with inductive coupling produced in the flexible wiring from the printer main device to the ink jet head or the wiring within the ink jet head.

Herein, though the noise with capacitive coupling is naturally apprehended, the clock frequency of the ink jet head is roughly at most several MHz, and if the logic power source voltage is about 5V, there is only a small possibility of having effect on the operation, in which the former inductive noise will have more effect to cause the malfunction. In particular, when the clock or the latch clock within the head substrate malfunctions due to the noise, there is a high possibility that the image data within the head substrate is completely different from the data transmitted from the printer main device, significantly having detrimental effect on the print quality.

Since the level of inductive noise is higher with larger variation of current per unit time, if the number of discharge orifices is increased for the higher speed printing, it is expected that the number of elements turned on simultaneously is further increased, so that the current value of the current pulse is further increased and the noise level is raised.

To resolve such a problem, some measures are conceived. One example is to reduce the number of heating elements turned on simultaneously by increasing the number of blocks to restrain the magnitude of the current pulse. However, in making the high speed printing, the interval of holding data by the latch circuit from one time to the next, that is, the discharge period, is shortened, so that the time allocated to each block is shortened by the increased number of blocks, and there is a risk that sufficient energy to discharge the ink may not be obtained.

Another resolution is also conceived which involves providing a capacitor for the current supply on or around a carriage itself for the printer main device supporting the ink jet head to reduce the inductive noise on the flexible substrate, or adding a noise countermeasure component to prevent malfunction, and in practice, there are many cases of adopting such a measure in the carriage portion for the ink jet printer. In such a case, however, the larger size of the carriage portion with this measure can not be avoided, resulting in a problem that the printer main device can not be reduced in size and the cost for the countermeasure component may be increased.

The above problem may be observed not only in an ink jet head with the heating elements arranged at high density and capable of attaining the high speed printing, but also other print heads, for example, a thermal head having heating elements arranged lengthwise or a print head having recording elements driven by the driving pulse arranged, which may cause malfunction due to the noise.

SUMMARY OF THE INVENTION

The present invention has been achieved in the light of the aforementioned problems, and its objective is to resolve the noise problem with the ink in an ink jet head without changing the substrate manufacturing process for the ink jet head, that is, increasing the cost on the manufacture, and without needs of disposing a specific noise countermeasure component on the side of the printer main device, or making the design change for the countermeasure.

To accomplish the above objective, the present invention is a print head substrate having a plurality of recording elements, a driver for driving said recording elements in accordance with the image data, an input portion for pulse width definition signal to define the width of pulse to be applied to said recording elements, and a block selection portion for dividing said plurality of recording elements into blocks each consisting of a predetermined number of elements and effecting time-division driving of each block as a unit, which are formed on a substrate, characterized in that an integration circuit is provided in a line of said pulse width definition signal to shift the timing of said driving pulse to be applied to recording elements within a block selected by said block selection portion.

Herein, a shift register for outputting serially input image data in parallel format and a latch circuit for temporarily storing data output from said shift register are provided on said substrate, and said heating elements, said driver, said input portion, said block selection portion, said shift register, and said latch circuit are formed on said substrate through a film formation process, said integration circuit having the form of a CR integration circuit constituted of a resistive component of a diffusion layer used in the film configuration of said driver, and a capacitive component utilizing a gate oxide film used in the film configuration of a drive control logic system including said shift register and said latch circuit, said CR integration circuit being formed concurrently in said film formation process.

Also, the present invention is a print head substrate having, a plurality of recording elements, a driver for driving said plurality of recording elements in accordance with the image data, a shift register for outputting serially input image data in parallel format, and a latch circuit for temporarily storing data output from said shift register, which are formed on a substrate, characterized in that a hysteresis circuit is formed on an input portion for the signal for a drive control logic system including said shift register and said latch circuit drive input signal so that the input data threshold value may be different depending on whether the signal is rising or falling.

Herein, said recording elements, said driver, said shift register, and said latch circuit are formed on said substrate through a film formation process, said hysteresis circuit has the form of a resistor made of a resistive component of a diffusion layer used in the film configuration of said driver, said resistor being formed concurrently in said film formation process.

Also, in the present invention, both said integration circuit and said hysteresis circuit can be provided, and further can be formed concurrently in said film formation process.

In addition, the present invention is characterized in that the print head substrate comprises said substrate and a member, in combination with said substrate, for forming liquid channels in connection with said heating elements and ink discharge orifices at one end of said liquid channels, and is applicable to the ink jet head.

Also, the present invention is characterized in that said recording elements are heating elements for generating heat energy.

The present invention provides a printing apparatus for performing the printing on the recording medium using said print head.

According to the present invention, in forming a print head substrate, a hysteresis circuit on the input portion and a CR integration circuit for input pulse width signal (heat pulse) are formed, along with recording elements (heating elements) and components for a logic discharge control circuit such as a driver, a shift register and so on, whereby the noise produced can be suppressed against the increased number of discharge orifices which is indispensable for the high speed printing, and the increased number of recording elements to be driven simultaneously which is associated with the high density packaging, and the stable operation can be achieved because of the increased margin for the noise. Correspondingly, there is no need for the special noise countermeasure for the carriage portion of the main device or the ink jet head itself, which is effective to realize the lower cost and the reduced size of the apparatus.

Also, if an integration circuit and a hysteresis circuit are formed by using the film configuration of each element on the substrate, the noise problem associated with the ink jet recording head can be resolved without needs of changing the conventional substrate manufacturing process, that is, increasing the cost on the manufacture, and providing the noise countermeasure component on the printing apparatus main device, the flexible substrate, or the carriage, or making the design change of the conventional drive sequence or circuit for the countermeasure on the side of the printing apparatus main device.

DETAILED DESCRIPTION OF THE PREFERRED EMBODIMENT

The preferred embodiment of the present invention will be described below with reference to the drawings.

Figure 1:
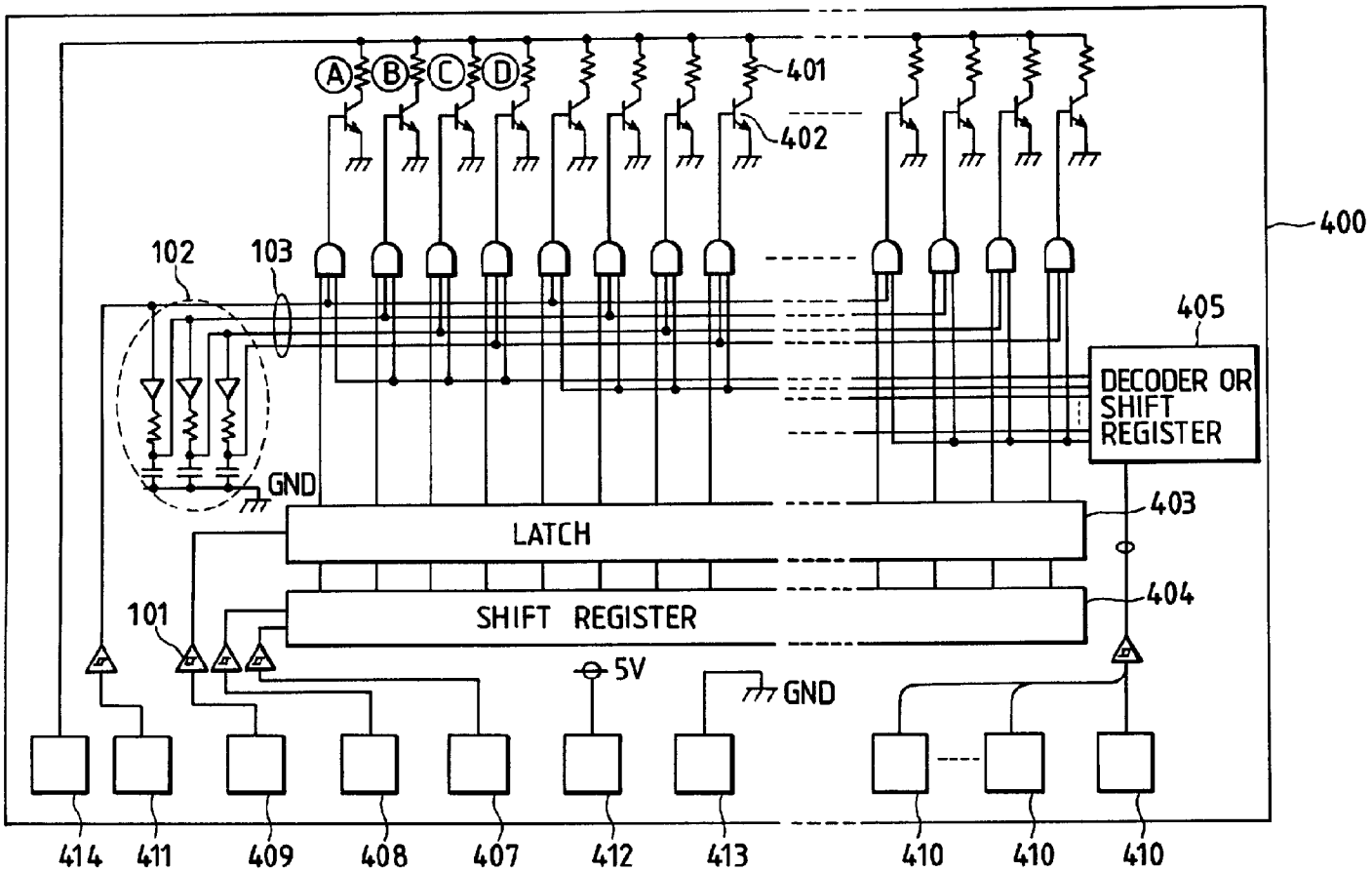
FIG. 1 is a circuit configurational diagram of an ink jet head substrate according to one embodiment of the present invention.
Figure 2A:
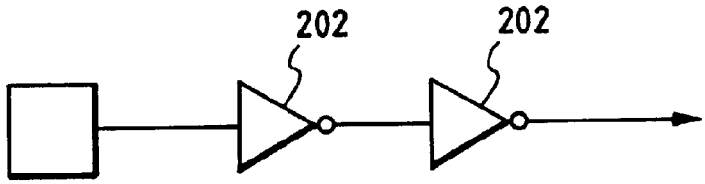
FIGS. 2A and 2B are configuration diagrams showing two examples of a hysteresis circuit within the ink jet head substrate according to one embodiment of the present invention.
Figure 2B:
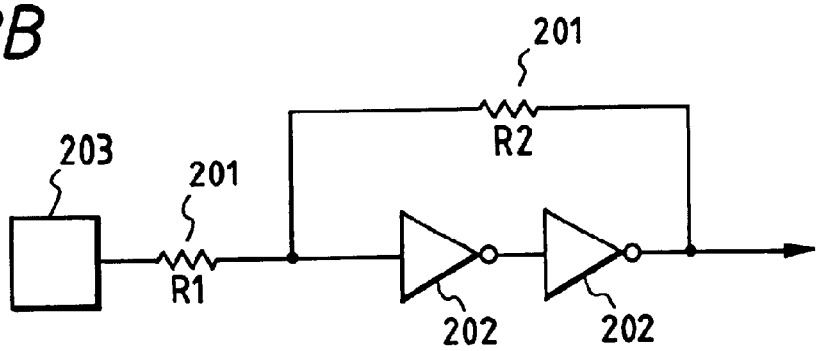

FIG. 1 is an example of the circuit configuration of an ink jet head substrate according to the present invention. 101 is a circuit for providing a hysteresis in the input threshold value. Wherein, in this embodiment, buffer portions 202 used in a conventional head substrate logic system input portion (shown in FIG. 2A), and further additional resistors 201 connected thereto as shown in FIG. 2B are provided. This can be simply constructed by utilizing a resistive component of a diffusion layer used in the film configuration of a driver. The ratio of the resistance R1 to R2 of resistor 201 is 1 to 2.5.

With this configuration, the threshold value for the conventional signal which serves as a judgment criterion between the high level and the low level was 2.5V irrespective of whether rising (from LOW to HIGH) or falling (from HIGH to LOW), whereas in this embodiment, the threshold value is 3.5V in the rising period and 1.5V in the falling period. That is, there is less possibility that the noise level exceeds the threshold value. Since the frequency of the signal to be input into the ink jet head substrate is not high, as described in a section of SUMMARY OF THE INVENTION, and there is no problem with the delay in response due to hysteresis provided in the input, there is a great effect of preventing malfunction with the configuration as in this embodiment.

It is needless to say that the width of hysteresis can be changed by varying the ratio of the resistance R1 to R2 of resistor 201, and it is desirable to have an appropriate resistance ratio in view of the variation in the resistive component of the diffusion layer.

In FIG. 1, 102 is a CR integration circuit constituted of three parts including a buffer, a resistive component of diffusion layer used in the film configuration of a driver 402 and a capacitive component utilizing a gate oxide film used in the film configuration of a logic control circuit, which integration circuit is provided in a heat pulse signal line corresponding to elements as many as the number of elements contained in the same block subtracted by 1. In the conventional signal line portion of heat pulse 411, the signal is transmitted in parallel and simultaneously to all the elements, whereas in this embodiment, because of one block consisting of four elements, three CR integration circuits are provided to make four types of line 103, and the wiring is made so that the time for passing heat pulse to four elements that are turned on simultaneously by a block selection circuit 405 is in practice shifted by 10 to 20 nsec between each element, and preferably 10 to 200 nsec.

Figures 3A, 3B, 3C, 3D, 3E, 3F, 3G:
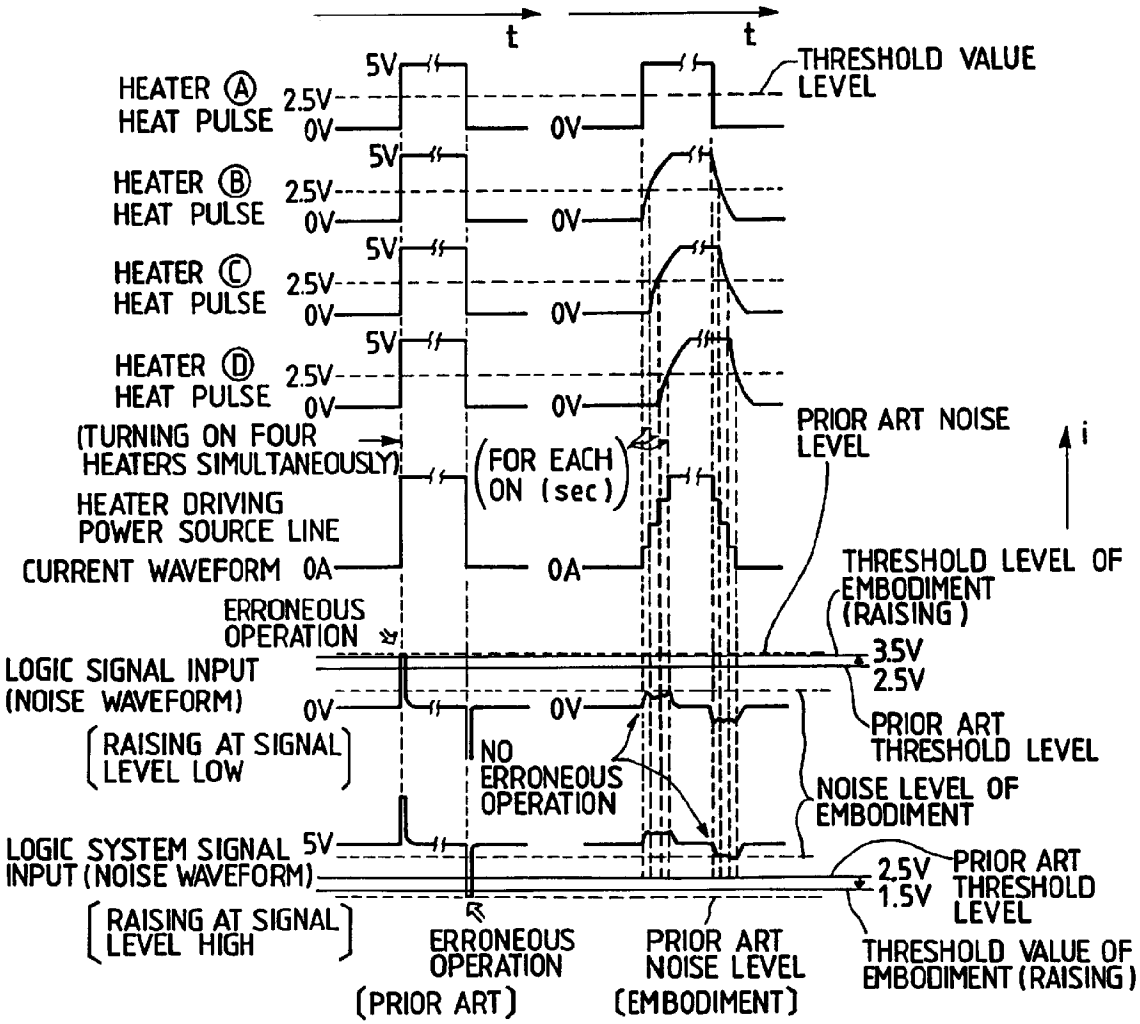
FIGS. 3A-G form a chart showing the heat pulse waveform, the drive current waveform, and the noise waveform within the ink jet head substrate in the conventional example and the present embodiment.
Figure 4:
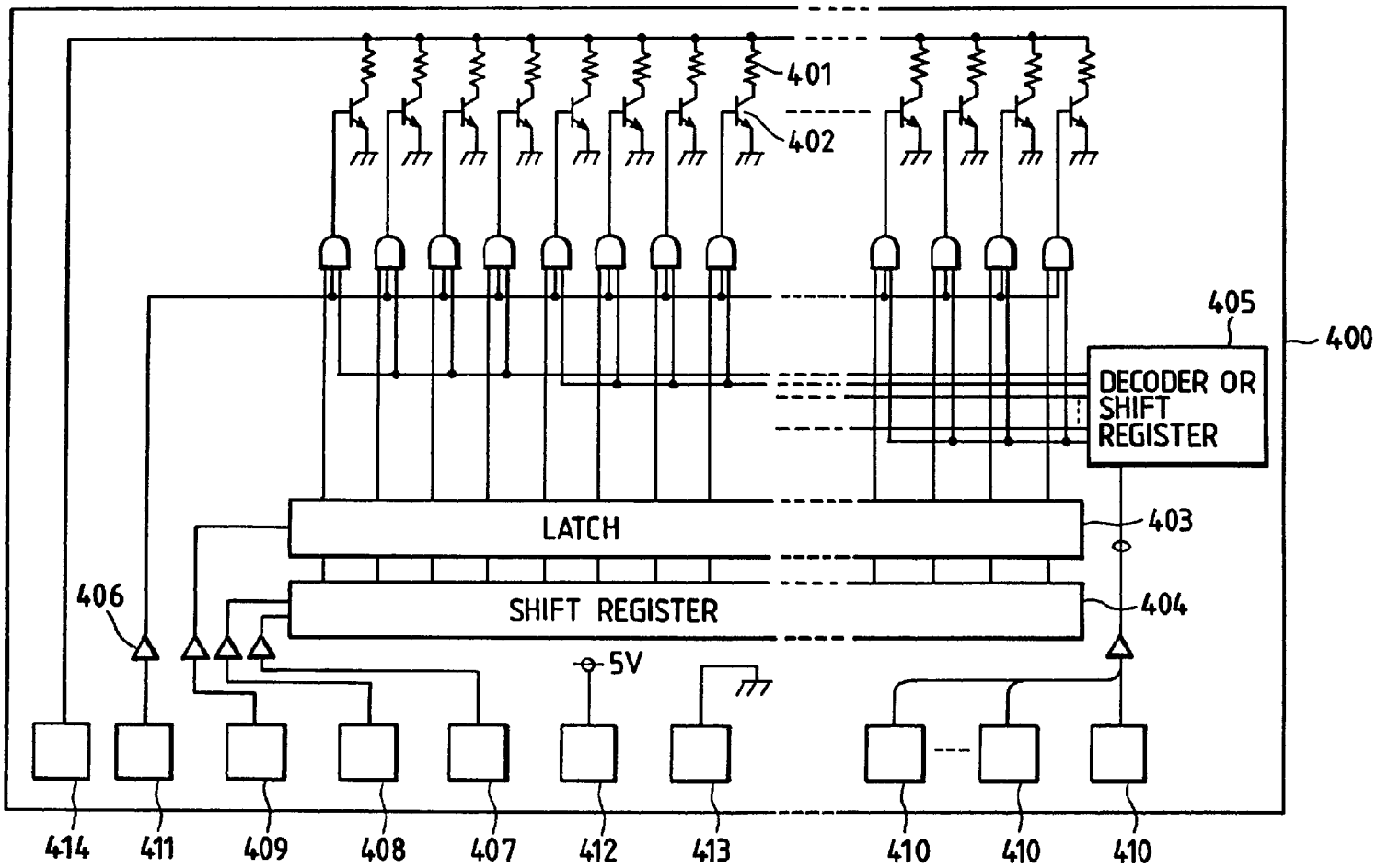
FIG. 4 PRIOR ART
FIG. 4 is a circuit configuration diagram of a conventional ink jet head substrate.

Herein, to make a comparison between the configuration of providing CR integration circuit 102 and the conventional configuration, attention is paid to the elements (heating elements) A, B, C, D selected at the same time by the block selection circuit 405 of FIG. 1, and it is presumed that while the signal from the latch 403 is all HIGH (active), that is, the heat pulse is HIGH (active), the power transistor 402 is turned on to pass current to the heating element 401. Referring to FIG. 3, the operation of this embodiment will be described below.

In FIG. 3, for the conventional example (on the left side in the figure) and this embodiment (on the right side in the figure), there are shown the voltage waveform in which heat pulse is applied to each of four elements A, B, C, D, and the time at which it exceeds the threshold value, the current pulse waveform passing through the line of heating element drive power source and GND at that time, and the voltage waveform of the logic system signal subjected to inductive noise produced by its current pulse for two cases wherein the practical level of its logic system signal is LOW (0V) and HIGH (5V) (for the comparison of the hysteresis circuit 101 between the conventional example and this embodiment).

In the conventional circuit configuration, heat pulse is passed to four elements A, B, C, D at the same time, and will simultaneously exceed the threshold value to turn on the power transistor 402, so that current starts to flow at once, that is, the variation of current per unit time in the rising portion is four times that when one heating element 401 is turned on, thereby raising the noise level produced in the logic system signal line by that amount. Hence, the threshold value of the logic system signal line is exceeded to cause a malfunction and transform the image data.

However, when the CR integration circuit 102 is constituted as described in this embodiment, the waveform in which the heat pulse of heating element A is integrated becomes a heat pulse of heating element B, as will be clear from the heat pulse waveform of FIG. 3, and the time at which the heating element B turns on after the heat pulse of heating element B practically exceeds the threshold value is delayed from the time for heating element A to turn on. Similarly, because heating elements C, D are delayed as well, the current pulse flowing through the heating element drive power source line is stepwise in accordance with the previous delay, as shown in FIG. 3. That is, the variation of current per unit time is not greatly different from that in which one heating element is turned on, so that the noise level is significantly reduced.

While this embodiment has been described with an instance in which four elements are selected as a block at the same time, and the heat pulse transmission time is shifted for each element, it will be appreciated that the number of elements making up one block can be appropriately determined, or several elements may be combined unless the noise level is problematic, so that any number of elements can be turned on simultaneously by increasing or decreasing the elements of the CR integration circuit and making appropriate wiring.

The above hysteresis circuit 101 and the CR integration circuit 102 can be manufactured at the same time by forming the drive control logic system including the heating elements, the driver, the shift register, and the latch circuit, the pulse width input portion 411 and the block selection circuit 405 on the substrate through the film formation process, and without changing the process of manufacturing the head substrate 400. Accordingly, because there is no need of changing greatly the number of pads in the input portion of the substrate or other circuit configuration within the substrate, the cost of the substrate itself is hardly increased. Also, since the noise can be suppressed within the head without need of attaching any parts such as a condenser for the countermeasure to the carriage portion, the apparatus main body can be embodied at lower cost and in smaller size.

Figure 5:
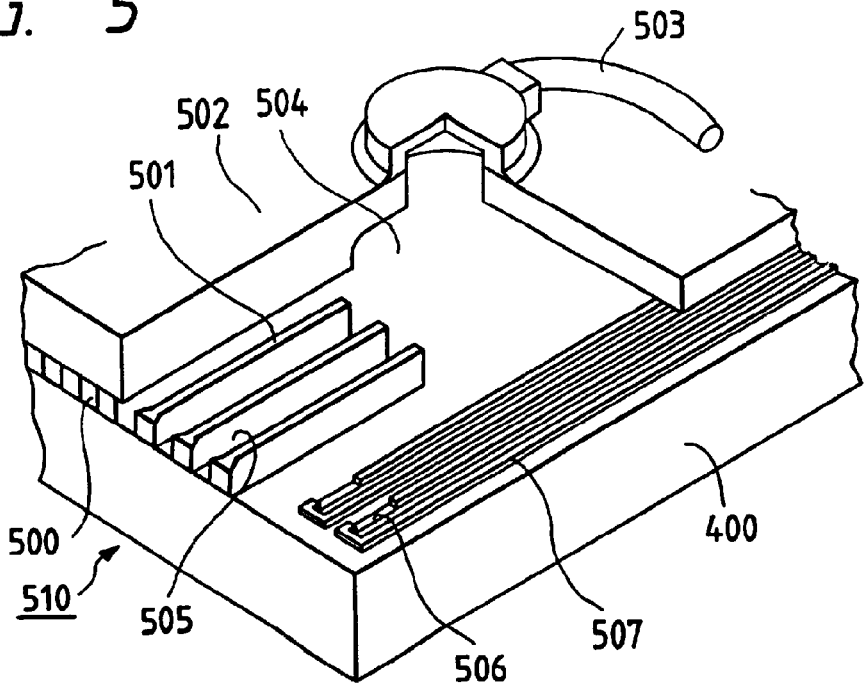
FIG. 5 is a typical perspective view showing a constitutional example of an ink jet head using the substrate as shown in FIG. 1.

On the head substrate thus constituted, a liquid channel wall member 501 to form liquid channels 505 communicating to a plurality of discharge orifices 500 and a ceiling plate 502 having an ink supply port 503 are mounted to have a recording head of the ink jet recording system, as shown in FIG. 5. In this case, the ink supplied through the ink supply port 503 is reserved in a common liquid chamber 504 provided inside, from which the ink is supplied to each liquid channel 505, and by driving heating elements 506 on the substrate 400 in this state, the ink is discharged from discharge orifices.

By mounting a recording head 510 of the above constitution on the recording apparatus main body and applying a signal from the apparatus main body to the recording head 501, an ink jet recording apparatus capable of high speed and high image quality recording can be obtained.

Figure 6:
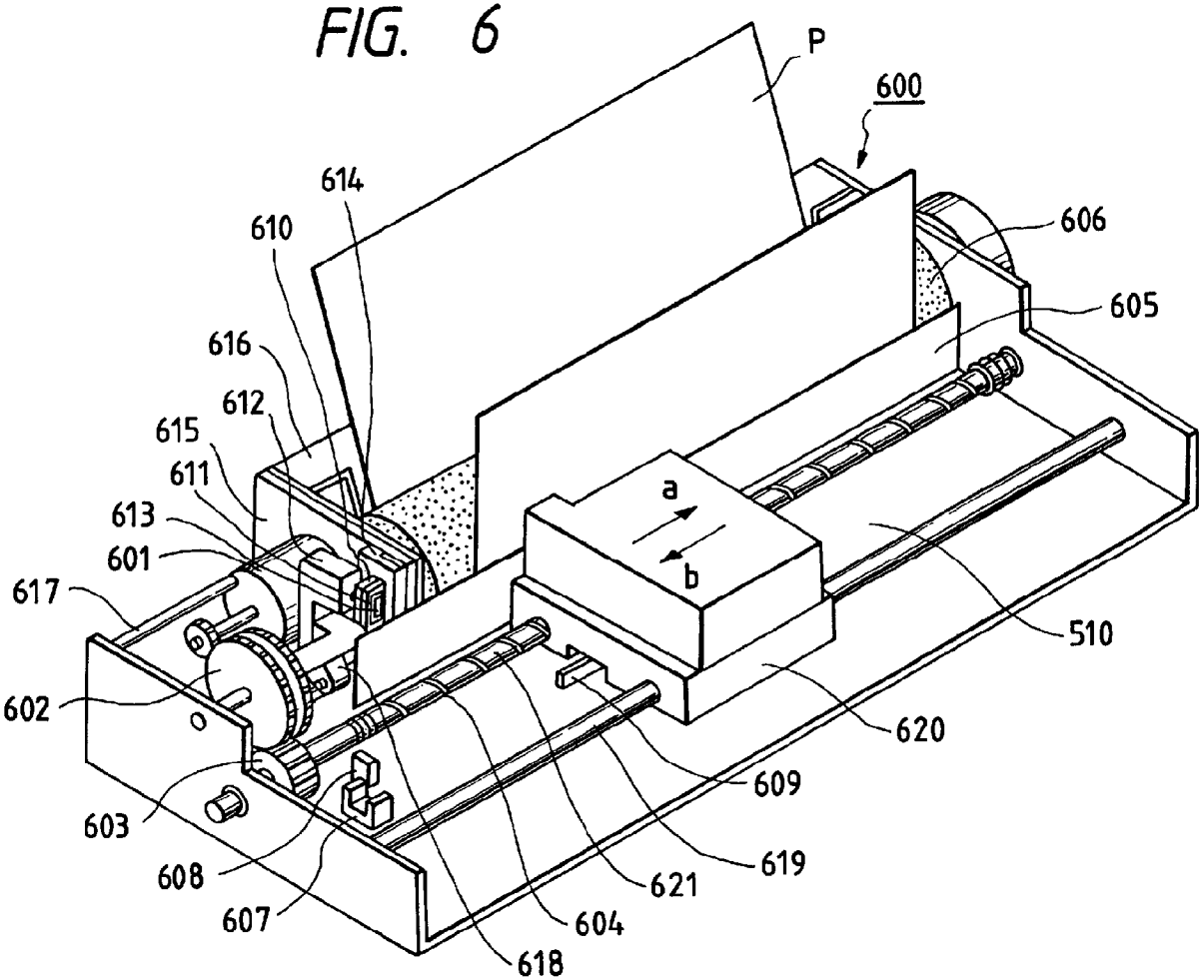
FIG. 6 is a typical perspective view showing a constitutional example of a printer using the head as shown in FIG. 5.

Next, an ink jet recording apparatus using a recording head of the present invention will be described with reference to FIG. 6. FIG. 6 is an external perspective view showing an example of the ink jet recording apparatus 600 to which the present invention is applied.

A recording head 510 is mounted on a carriage 620 engaging a helical groove 621 of a lead screw 604 rotating via driving force transmission gears 602, 603, linked with the forward or backward rotation of a drive motor 601, and reciprocated in the directions of the arrows a, b along a guide 619, together with the carriage 620, by the motive power of said driving motor 601. A paper presser plate 605 for the recording sheet P to be conveyed on a platen 606 by a recording medium feeding unit, not shown, presses the recording sheet P against the platen 606 over the carriage moving direction.

607, 608 are photo-couplers which are home position detecting means to switch the rotation direction of the drive motor 601 by confirming a lever 609 of the carriage 620 residing in this range. 610 is a support member for supporting a cap member 611 for capping the entire surface of the recording head 510, and 612 is suction means for sucking the ink inside the cap member 611 to effect the suction recovery of the recording head 510 via an opening 613 within the cap. 614 is a cleaning blade, and 615 is a moving member for enabling this blade to move in forward and backward directions, these being supported on a main body support plate 616. It is needless to say that for the cleaning blade 614, a well-known cleaning blade can be applied in this example, besides the above-described form. Also, 617 is a lever to start the suction of the suction recovery operation, which is moved along with the movement of a cam 618 in engagement with the carriage 620, the driving force from the drive motor 601 being controlled for the movement by well-known transmission means such as a clutch switch. A print control unit for applying a signal to the heating elements 506 provided on the recording head 510 or governing the drive control of each mechanism as above described is provided on the side of the apparatus main body (not shown).

The ink jet recording apparatus 600 with the above constitution performs the recording on a recording sheet P conveyed on the platen 606 by the recording medium feeding device, while the recording head 510 is reciprocating over the entire width of the recording sheet P, in which the high precision and high speed recording can be made because the recording head 510 is manufactured by the method as previously described.

While in the above description the substrate is adopted for the recording head of the ink jet system, it will be understood that the substrate according to the present invention is also applicable to the thermal head substrate.

The present invention brings about excellent effects particularly in a recording head or a recording device of the system of comprising means for generating heat energy (e.g., electricity-heat converter or laser beam) as the energy to be used for the ink discharge and causing state changes of the ink due to the heat energy among the various ink jet recording systems. With such a system, the recording with higher density and higher resolution can be obtained.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleus boiling corresponding to the recording information on electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into the pulse shapes, growth and shrinkage of the bubbles can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. Nos. 4,558,333 or 4,459,600 disclosing the constitution having the heat acting portion arranged in the flexed region is also included in the present invention. In addition, the present invention can be also effectively made the constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure wave of heat energy correspondent to the discharging portion. That is, the present invention allows the secure and efficient recording to be effected in whatever form of the recording head.

Further, the present invention is effectively applicable to the recording head of the full line type having a length corresponding to the maximum width of a recording medium which can be recorded by the recording device. As such a recording head, either the constitution which satisfies its length by a combination of a plurality of recording heads or the constitution as one recording head integrally formed may be used.

In addition, among the serial-type recording heads as above described, the present invention is effective for a recording head fixed to the main device, a recording head of the freely exchangeable chip type which enables electrical connection to the main device or supply of ink from the main device by being mounted on the main device, or a recording head of the cartridge type having an ink tank integrally provided on the recording head itself.

Also, addition of a discharge recovery means for the recording head, a preliminary auxiliary means, etc., provided as the constitution of the recording device of the present invention is preferable, because the effect of the present invention can be further stabilized. Specific examples of these may include, for the recording head, capping means, cleaning means, pressurization or suction means, electricity-heat converters or another type of heating elements, or preliminary heating means according to a combination of these, and pre-discharging means which performs discharging separate from recording.

As for the type or number of recording heads mounted, the present invention is effective to a single recording head provided corresponding to the monocolor ink or a plurality of recording heads corresponding to a plurality of inks having different recording colors or densities, for example. That is, as the recording mode of the recording device, the present invention is extremely effective for not only the recording mode only of a primary color such as black, etc., but also a device equipped with at least one of plural different colors or full color by color mixing, whether the recording head may be either integrally constituted or combined in plural number.

In addition, though the ink is considered as the liquid in the embodiment as above described, other inks may be also usable which are solid below room temperature and will soften or liquefy at or above room temperature, or liquefy when a recording signal used is issued as it is common with the ink jet device to control the viscosity of ink to be maintained within a certain range of the stable discharge by adjusting the temperature of ink in a range from 30° C. to 70° C. In addition, in order to avoid the temperature elevation due to heat energy by positively utilizing the heat energy as the energy for the change of state from solid to liquid, or to prevent the evaporation of ink, the ink which will stiffen in the shelf state and liquefy by heating may be usable. In any case, the use of the ink having a property of liquefying only with the application of heat energy, such as those liquefying with the application of heat energy in accordance with a recording signal so that liquid ink is discharged, or may be solidifying prior to reaching a recording medium, is also applicable in the present invention. In such a case, the ink may be held as liquid or solid in recesses or through holes of a porous sheet, which is placed opposed to electricity-heat converters, as described in Japanese Laid-Open Patent Application No. 54-56847 or No. 60-71260. The most effective method for the inks as above described in the present invention is based on the film boiling.

Further, the ink jet recording apparatus according to the present invention may be used as an image output terminal in an information processing equipment such as a computer, a copying machine in combination with a reader, or a facsimile terminal equipment having the transmission and reception feature.

As above described, with the present invention, in forming an ink jet head substrate, there are formed a hysteresis circuit on the input portion and a CR integration circuit for an input pulse width signal (heat pulse), together with recording elements and components for a logic discharge control circuit such as a driver, a shift register and so on, whereby the noise produced by the increased number of discharge orifices which is indispensable for the high speed printing, and the increased number of recording elements to be driven simultaneously which is associated with the high density packaging can be suppressed, and the stable operation can be achieved owing to the increased margin for the noise. Accordingly, there is no need of providing the special noise countermeasure for the carriage portion of the main device or the ink jet head itself, which is effective to realize the recording apparatus of the lower cost and smaller size.

What is claimed is:

1. A print head substrate, comprising:

a plurality of recording elements;

a driver for driving said plurality of recording elements in accordance with image data;

an input portion for inputting a pulse width definition signal to define a width of [a] driving [pulse] *pulses* to be applied *respectively* to said plurality of recording elements;

driving means for dividing said plurality of recording elements into blocks, each of said blocks consisting of a predetermined number of said plurality of recording elements *greater than 2* for a time-division driving of each said block as a unit; and an integration circuit *comprising a resistive component and a capacitive component* for producing, corresponding to an input of the pulse width definition signal, a plurality of drive pulses, for applying *said driving pulses having the width defined by* said pulse width definition signal to *at least some of* said plurality of recording elements in [said] *a* block *of said blocks, the plurality of drive pulses being* shifted [by predetermined interval] *by a predetermined interval from one another, by a delay in rise of the drive pulses due to the resistive component and the capacitive component, wherein said driving pulses are applied to the least some of said plurality of recording elements in the block at a timing corresponding to the plurality of drive pulses shifted from one another*.

2. A print head substrate according to claim 1, wherein said plurality of recording elements comprise heating elements for generating heat energy as a consequence of the driving [pulse] *pulses*.

3. A print head substrate according to claim 2, wherein said *print head* substrate is used in a print head of an ink jet system for discharging an ink using said heating elements.

4. A print head substrate according to claim 1, further comprising:

a shift register for outputting serially input image data in parallel format; and a latch circuit for temporarily storing data output from said shift register.

5. A print head substrate according to claim 4, wherein said plurality of recording elements, said driver, said input portion, said driving means, said shift register, and said latch circuit are formed on said *print head* substrate through a film formation process, and wherein said integration circuit has a form of a CR integration circuit constituted of [a] *the* resistive component of a diffusion layer used in a film configuration of said driver, and [a] *the* capacitive component [utilizing] *utilizes* a gate oxide film used in the film configuration of a drive control logic system including said shift register and said latch circuit.

6. A print head substrate according to claim 4, wherein said driver is formed through a film formation process, said integration circuit being formed simultaneously in said film formation process.

7. A print head substrate according to claim 1, wherein said pulse width definition signal is inputted correspondingly to the driving per each of said blocks, and recording elements of [the] *a* selected block [is] *are* driven by plural drive pulses produced by said integration circuit.

8. A print head substrate according to claim 1, wherein said integration circuit is formed in a line of said pulse width definition signal.

9. A print head substrate, comprising:

a plurality of recording elements;

a driver for driving said plurality of recording elements in accordance with [an] image data;

a current input portion receiving the current for supplying to said plurality of recording elements;

a drive control logic system outputting [the] *an* input image signal to said driver for controlling the driving of the plurality of recording elements;

a signal input portion receiving [the] *a* signal for inputting to said drive control logic system; and a hysteresis circuit *comprising a resistor* for preventing the current inputted to said current input portion from influencing said signal arranged on the signal input portion for the signal of said drive control logic system, wherein a threshold value of the signal inputted into said drive control logic system [may be] *defined by the hysteresis circuit is* different depending upon whether the signal is rising or falling,

*wherein the resistor of the hysteresis circuit is made of a resistive component of a diffusion layer used in a film configuration of said driver*.

10. A print head substrate according to claim 9, wherein said input portion and a block selection means are formed on said *print head* substrate through a film formation process, *wherein* said *print head substrate further comprises an* integration circuit having a form of a CR integration circuit constituted of a resistive component of a diffusion layer used in [a] *the* film configuration of said driver, and a capacitive component utilizing a gate oxide film used in the film configuration of [a] *said* drive control logic system, *said drive control logic system* including [said] *a* shift register and [said] *a* latch circuit, said CR integration circuit being formed simultaneously *with said hysteresis circuit* in said film formation process.

11. A print head substrate according to claim 9, wherein said plurality of recording elements comprise heating elements for generating heat energy as a consequence of [the] *a* driving pulse.

12. A print head substrate according to claim 11, wherein said *print head* substrate is used in a print head of an ink jet system for discharging an ink using said heating elements.

13. A print head substrate according to claim 9, wherein the signal inputted into said drive control logic system includes a signal of the image data inputted into [said] *a* shift register.

14. A print head substrate according to claim 9, wherein the signal inputted into said drive control logic system includes a latch signal inputted for controlling a latch circuit.

15. A print head substrate according to claim 9, wherein said drive control logic system includes block selecting means for driving said plurality of recording elements by blocks, each of said blocks consisting of a predetermined number of said recording elements for a time-division driving of each said block as a unit, and wherein a signal inputted into said drive control logic system includes a signal for selecting each of said blocks.

16. A print head substrate according to claim 9, further comprising:

an input portion for receiving a pulse width definition signal for defining a width of a driving pulse applied to said plurality of recording elements, wherein said hysteresis circuit sets a threshold value of said pulse width definition signal so that the threshold value differs depending upon whether the signal is rising or falling.

17. A print head substrate according to claim 9, wherein said plurality of recording elements, said driver, [said] *a* shift register, and [said] *a* latch circuit are formed on said *print head* substrate through a film formation process[, and said hysteresis circuit has a form of a resistor made of a resistive component of a diffusion layer used in a film configuration of said driver], said resistor *of the hysteresis circuit* being formed simultaneously in said film formation process.

18. A print head substrate according to claim 17, wherein there are further formed, on said *print head* substrate[,]*:* an input portion for inputting of a pulse width definition signal defining a width of [a] driving [pulse] *pulses* applied to [said] heating elements [and] *of said recording elements;* block selecting means for driving said recording elements by blocks, each of said blocks consisting of a predetermined number of said recording elements for time-division driving of each said block as a unit[, the print head substrate comprising]*; and* an integration circuit in a line of said pulse width definition signal to shift the timing of said driving pulse to be applied to the heating elements within a block selected by said block selecting means.

19. A print head substrate according to claim 9, said drive control logic system further comprising:

a shift register for outputting serially input image data in parallel format; and a latch circuit for temporarily storing data output from said shift register.

20. An ink jet head, comprising:

a print head substrate, comprising[;]*;* a plurality of recording elements[,]*;* a driver for driving said plurality of recording elements in accordance with [an] image data[.]*;* an input portion for inputting a pulse width definition signal to define a width of [a] driving [pulse] *pulses* to be applied *respectively* to said plurality of recording elements[.]*;* driving means for dividing said plurality of recording elements into blocks, each of said blocks consisting of a predetermined number of said recording elements *greater than 2* for a time-division driving of each said block as a unit[,]*; and* an integration circuit *comprising a resistive component and a capacitive component* for producing, corresponding to an input of the pulse width definition signal, a plurality of drive pulses, for applying *said driving pulses having a width defined by* said pulse width definition signal to *at least two of* said plurality of recording elements in [said] *a* block *of the blocks, the plurality of drive pulses being* shifted [by predetermined interval] *by a predetermined interval from one another, by a delay in rise of the drive pulses due to the resistive component and the capacitive component, wherein said driving pulses are applied to the at least two of said plurality of recording elements in the block at a timing corresponding to the plurality of drive pulses shifted from one another*; and an orifice for emitting an ink as a consequence of energy generated by at least one said recording element.

21. An ink jet head according to claim 20, wherein said plurality of recording elements comprise heating elements for generating heat energy as a consequence of the driving [pulse] *pulses*.

22. An ink jet head according to claim 21, wherein said *print head* substrate is used in a print head of an ink jet system for discharging [an] ink using said heating elements.

23. A print apparatus, comprising:

an ink jet head according to claim 20; and means for mounting and reciprocating [an] *said* ink jet head.

24. An ink jet head, comprising:

a print head substrate, comprising[;]*:* a plurality of recording elements;

a driver for driving said plurality of recording elements in accordance with [an] image data;

a current input portion receiving the current for supplying to said plurality of recording elements;

a drive control logic system outputting [the] *an* input image signal to said driver for controlling the driving of the plurality of recording elements;

a signal input portion receiving [the] *a* signal for inputting to said drive control logic system; and a hysteresis circuit *comprising a resistor* for preventing the current inputted to said current input portion from influencing said signal arranged on the signal input portion for the signal of said drive control logic system, wherein a threshold value of the signal inputted into said drive control logic system [may be] *defined by the hysteresis circuit is* different depending upon whether the signal is rising or falling; and an orifice for emitting [an] ink as a consequence of energy generated by at least one said recording element,

*wherein the resistor of the hysteresis circuit is made of a resistive component of a diffusion layer used in a film configuration of said driver.*

25. An ink jet head according to [either of claims 24 and 19] *claim 24*, wherein said plurality of recording elements comprise heating elements for generating heat energy as a consequence of [the] *a* driving pulse.

26. An ink jet head according to [either of claims 24 and 19] *claim 24*, wherein said *print head* substrate is used in a print head of an ink jet system for discharging [an] ink using [said] heating elements *of the plurality of recording elements*.

27. An ink jet head, comprising:

a plurality of recording elements[,]*;* a driver for driving said plurality of recording elements in accordance with [an] image data[,]*;* a current input portion receiving the current for supplying to said plurality of recording elements;

a drive control logic system outputting [the] *an* input image signal to said driver for controlling the driving of the plurality of recording elements;

a signal input portion receiving [the] *a* signal for inputting to said drive control logic system; [and]

a hysteresis circuit *comprising a resistor* for preventing the current inputted to said current input portion from influencing said signal arranged on the signal input portion for the signal of said drive control logic system, wherein a threshold value of the signal inputted into said drive control logic system [may be] *defined by the hysteresis circuit is* different depending upon whether the signal is rising or falling; and an orifice for emitting [an] ink as a consequence of the energy generated by at least one said recording element,

*wherein the resistor of the hysteresis circuit is made of a resistive component of a diffusion layer used in a film configuration of said driver.*

28. An ink jet head according to claim 27, said drive control logic system further comprising:

a shift register for outputting serially input image data in parallel format;

and a latch circuit for temporarily storing data output from said shift register.

29. An ink jet head according to [either of claims 24 and 28] *claim 24*, wherein the signal inputted into said drive control logic system includes a signal of the image data inputted into [said] *a* shift register *of the drive control logic system*.

30. An ink jet head according to [either of claims 24 and 28] *claim 24*, wherein the signal inputted into said drive control logic system includes a latch signal inputted for controlling a latch circuit.

31. An ink jet head according to [either of claims 24 and 28] *claim 24 or claim 28*, wherein said drive control logic system includes block selecting means for driving said plurality of recording elements by blocks, each of said blocks consisting of a predetermined number of said recording elements for a time-division driving of each said block as a unit, and wherein [a] *the* signal inputted into said drive control logic system includes a signal for selecting each of said blocks.

32. An ink jet head according to [either of claims 24 and 28] *claim 24 or 28*, further comprising:

an input portion for receiving a pulse width definition signal for defining a width of a driving pulse applied to said recording elements, wherein said hysteresis circuit sets a threshold value of said pulse width definition signal so that the threshold value differs depending upon whether the *pulse width definition* signal is rising or falling.

33. A print apparatus, comprising:

an ink jet head according to claim 27; and means for mounting and reciprocating [an] *said* ink jet head.

34. A print apparatus according to claim 33, further comprising:

means for supplying said signal.

35. A print apparatus according to [either of claims 33 and 34] *claim 33 or 34*, wherein said recording elements comprise heating elements for generating heat energy as a consequence of [the] *a* driving pulse.

36. A print-apparatus according to claim 33, said drive control logic system further comprising:

a shift register for outputting serially input image data in parallel format; and a latch circuit for temporarily storing data output from said shift register.

*37. A print head substrate according to claim 19, wherein said plurality of recording elements comprise heating elements for generating heat energy as a consequence of a driving pulse.*

*38. A print head substrate according to claim 19, wherein said print head substrate is used in a print head of an ink jet system for discharging ink using heating elements of the plurality of recording elements.*

*39. An ink jet head according to claim 28, wherein the signal inputted into said drive control logic system includes a signal of the image data inputted into said shift register.*

*40. An ink jet head according to claim 28, wherein the signal inputted into said drive control logic system includes a latch signal inputted for controlling the latch circuit.*

*41. A print head substrate, comprising:*

*a plurality of recording elements;*

*a driver for driving said plurality of recording elements in accordance with image data;*

*an input portion for inputting a pulse width definition signal to define a width of driving pulses to be applied respectively to said plurality of recording elements;*

*driving means for dividing said plurality of recording elements into blocks, each of said blocks consisting of a predetermined number of said plurality of recording elements, greater than 2, for a time-division driving of each said block as a unit; and*

*a delaying circuit for producing, corresponding to an input of the pulse width definition signal, a plurality of drive pulses, for applying said driving pulses having the width defined by said pulse width definition signal to at least some of said plurality of recording elements in a block of said blocks,*

*the plurality of drive pulses being shifted by a predetermined interval from one another, by a delay in rise of the drive pulses due to the electrical resistance and electrical capacitance in the delaying circuit, wherein said driving pulses are applied to at least some of said plurality of recording elements in the block at a timing corresponding to the plurality of drive pulses shifted from one another.*

*42. A print head substrate according to claim 41, wherein said driving pulses are applied to at least two of said plurality of recording elements in the block at a timing such that driving periods of the at least two of said predetermined number of said plurality of recording elements in the block are partially overlapped with each other.*

*43. A print head substrate according to claim 41, wherein the plurality of drive pulses are shifted by a predetermined interval from one another such that HIGH state periods of the plurality of drive pulses are partially overlapped with each other.*

*44. A print head substrate according to claim 41, wherein the delaying circuit is in a line of the pulse width definition signal electrically connected to the input portion.*

*45. A print head substrate according to claim 44, wherein said plurality of recording elements comprise heating elements for generating heat energy as a consequence of the driving pulses.*

*46. A print head substrate according to claim 45, wherein said print head substrate is used in a print head of an ink jet system for discharging an ink using said heating elements.*

*47. A print head substrate according to claim 44, further comprising:*

*a shift register for outputting serially input image data in parallel format; and*

*a latch circuit for temporarily storing data output from said shift register.*

*48. A print head substrate according to claim 47, wherein said plurality of recording elements, said driver, said input portion, said driving means, said shift register, and said latch circuit are formed on said print head substrate through a film formation process, and wherein said delaying circuit has a form of a CR integration circuit constituted of a resistive component of a diffusion layer used in a film configuration of said driver, and a capacitive component utilizes a gate oxide film used in the film configuration of a drive control logic system including said shift register and said latch circuit.*

*49. A print head substrate according to claim 47, wherein said driver is formed through a film formation process, said delaying circuit being formed simultaneously in said film formation process.*

*50. A print head substrate according to claim 44, wherein said pulse width definition signal is inputted correspondingly to the driving per each of said blocks, and recording elements of a selected block are driven by plural drive pulses produced by said delaying circuit.*

*51. A print head substrate according to claim 41, wherein at least two of the plurality of drive pulses are shifted by a predetermined interval from one another such that at least two of the plurality of drive pulses are partially overlapped with each other.*

*52. A print head substrate, comprising:*

*a plurality of recording elements;*

*a driver for driving said plurality of recording elements in accordance with image data;*

*an input portion for inputting a pulse width definition signal to define a width of driving pulses to be applied respectively to said plurality of recording elements;*

*driving means for dividing said plurality of recording elements into blocks, each of said blocks consisting of at least some of said plurality of recording elements greater in number than 2, for a time-division driving of each said block as a unit; and*

*a delaying circuit for producing, corresponding to an input of the pulse width definition signal, a plurality of drive pulses, for applying said driving pulses having the width defined by said pulse width definition signal to at least some of said plurality of recording elements in a block of said blocks, the plurality of drive pulses being shifted by a predetermined interval from one another, by a delay in rise of the drive pulses due to electrical resistance and electrical capacitance effected by the delaying circuit, wherein said driving pulses are applied to said plurality of recording elements in the block at a timing corresponding to the plurality of drive pulses shifted from one another.*

*53. A print head substrate according to claim 52, wherein said driving pulses are applied to at least two of said plurality of recording elements in the block at a timing such that driving periods of the at least two of said plurality of recording elements in the block are partially overlapped with each other.*

*54. A print head substrate according to claim 52, wherein the plurality of drive pulses are shifted by a predetermined interval from one another such that the plurality of drive pulses are partially overlapped with each other.*

*55. A print head substrate according to claim 52, wherein the delaying circuit is in a line of the pulse width definition signal electrically connected to the input portion.*

*56. A print head substrate according to claim 55, wherein said plurality of recording elements comprise heating elements for generating heat energy as a consequence of the driving pulses.*

*57. A print head substrate according to claim 56, wherein said print head substrate is used in a print head of an ink jet system for discharging an ink using said heating elements.*

*58. A print head substrate according to claim 55, further comprising:*

*a shift register for outputting serially input image data in parallel format; and*

*a latch circuit for temporarily storing data output from said shift register.*

*59. A print head substrate according to claim 58, wherein said plurality of recording elements, said driver, said input portion, said driving means, said shift register, and said latch circuit are formed on said print head substrate through a film formation process, and wherein said delaying circuit has a form of a CR integration circuit constituted of the resistive component of a diffusion layer used in a film configuration of said driver, and the capacitive component utilizes a gate*

*oxide film used in the film configuration of a drive control logic system including said shift register and said latch circuit.*

*60. A print head substrate according to claim 58, wherein said driver is formed through a film formation process, said delaying circuit being formed simultaneously in said film formation process.*

*61. A print head substrate according to claim 55, wherein said pulse width definition signal is inputted correspondingly to the driving per each of said blocks, and recording elements of a selected block are driven by plural drive pulses produced by said delaying circuit.*

*62. A print head substrate according to claim 52, wherein the plurality of drive pulses are shifted by a predetermined interval from one another such that HIGH state periods of at least two of the plurality of drive pulses are partially overlapped with each other.*

*63. A print head comprising:*

*a plurality of recording elements;*

*a driver for driving said plurality of recording elements in accordance with image data;*

*an input portion for inputting a pulse width definition signal to define a width of driving pulses to be applied respectively to said plurality of recording elements;*

*driving means for dividing said plurality of recording elements into blocks, each of said blocks consisting of a predetermined number of said plurality of recording elements, greater than 2, for a time-division driving of each said block as a unit; and*

*a delaying circuit for producing, corresponding to an input of the pulse width definition signal, a plurality of drive pulses, for applying said driving pulses having the width defined by said pulse width definition signal to at least some of said plurality of recording elements in a block of said blocks,*

*the plurality of drive pulses being shifted by a predetermined interval from one another, by a delay in rise of the drive pulses due to the electrical resistance and electrical capacitance in the delaying circuit, wherein said driving pulses are applied to at least some of said plurality of recording elements in the block at a timing corresponding to the plurality of drive pulses shifted from one another.*

*64. A print head, comprising:*

*a plurality of recording elements;*

*a driver for driving said plurality of recording elements in accordance with image data;*

*an input portion for inputting a pulse width definition signal to define a width of driving pulses to be applied respectively to said plurality of recording elements;*

*driving means for dividing said plurality of recording elements into blocks, each of said blocks consisting of a predetermined number of said plurality of recording elements greater than 2, for a time-division driving of each said block as a unit; and*

*a delaying circuit for producing, corresponding to an input of the pulse width definition signal, a plurality of drive pulses, for applying said driving pulses having the width defined by said pulse width definition signal to said plurality of recording elements in a block of said blocks, the plurality of drive pulses being shifted by a predetermined interval from one another, by a delay in rise of the drive pulses due to electrical resistance and electrical capacitance effected by the delaying circuit, wherein said driving pulses are applied to said plurality of recording elements in the block at a timing corresponding to the plurality of drive pulses shifted from one another.*

* * * * *